United States Patent
Wyland et al.

(10) Patent No.: US 6,205,462 B1
(45) Date of Patent: Mar. 20, 2001

(54) DIGITAL MULTIPLY-ACCUMULATE CIRCUIT THAT CAN OPERATE ON BOTH INTEGER AND FLOATING POINT NUMBERS SIMULTANEOUSLY

(75) Inventors: David C. Wyland, Morgan Hill; David A. Harrison, Cupertino, both of CA (US)

(73) Assignee: Cradle Technologies, Fremont, CA (US)

( * ) Notice: Subject to any disclaimer, the term of this patent is extended or adjusted under 35 U.S.C. 154(b) by 0 days.

(21) Appl. No.: 09/414,322

(22) Filed: Oct. 6, 1999

(51) Int. Cl.$^7$ .................................................. G06F 7/44
(52) U.S. Cl. ................................................. 708/503
(58) Field of Search ..................... 708/503, 501

(56) References Cited

U.S. PATENT DOCUMENTS

| | | | |
|---|---|---|---|
| 4,038,538 | 7/1977 | Semmelhaack et al. | 235/154 |
| 4,511,990 | 4/1985 | Hagiwara et al. | 364/748 |
| 4,617,641 | 10/1986 | Hamada | 364/748 |
| 4,620,292 * | 10/1986 | Hagiwara et al. | 708/503 |
| 4,631,696 | 12/1986 | Sakamoto | 364/748 |
| 4,805,128 | 2/1989 | Nelsen et al. | 364/715.03 |
| 4,953,119 * | 8/1990 | Wong et al. | 708/503 |
| 5,185,713 * | 2/1993 | Kobunaya | 708/501 |
| 5,257,215 | 10/1993 | Poon | 364/745 |
| 5,272,654 | 12/1993 | Nix | 364/715.03 |
| 5,301,137 * | 4/1994 | Matsuo et al. | 708/501 |
| 5,561,615 | 10/1996 | Kuo et al. | 364/715.03 |
| 5,619,198 | 4/1997 | Blackham et al. | 341/50 |

* cited by examiner

Primary Examiner—Tan V. Mai
(74) Attorney, Agent, or Firm—Thomas Schneck

(57) ABSTRACT

Disclosed is a Multiply-Accumulate circuit that includes an exponent adder circuit, a mantissa multiplier circuit, a shifter, a full adder, and an accumulator. The product adder circuit receives two operands in a special combined data format which prescribes a mantissa and an exponent for both integer and floating point operands. The exponent adder circuit adds the exponents of the two operands. But if before the addition the exponent adder circuit detects an integer as an operand, it replaces the exponent of the integer by a substitute value in that addition. This substitute value is related to the number of bits of the mantissa of the integer. The mantissa multiplier circuit multiplies the two mantissas of the two operands. The shifter shifts the resultant product of multiplication into a pre-defined fixed point format according to the resultant sum of the addition generated by the exponent adder circuit. The full adder adds this shifted product to the current content of the accumulator.

20 Claims, 3 Drawing Sheets

FIG._1A
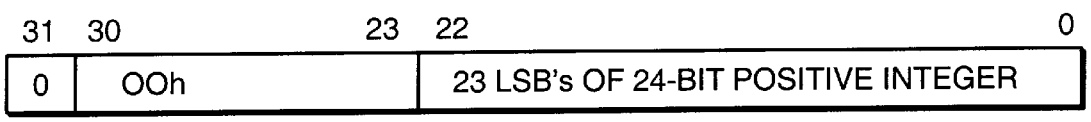
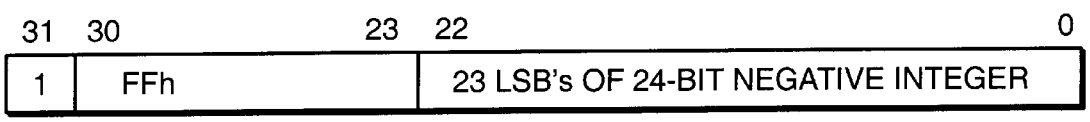
FIG._1B
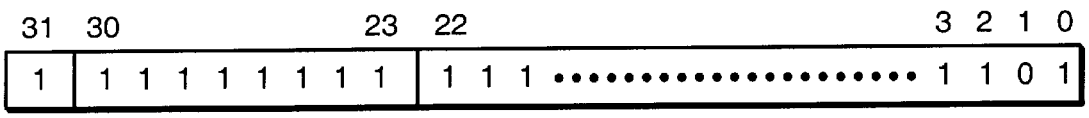
FIG._1C
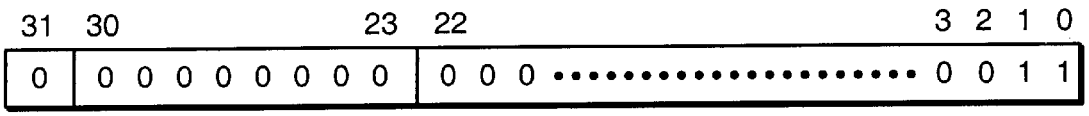
FIG._1D
FIG._1E

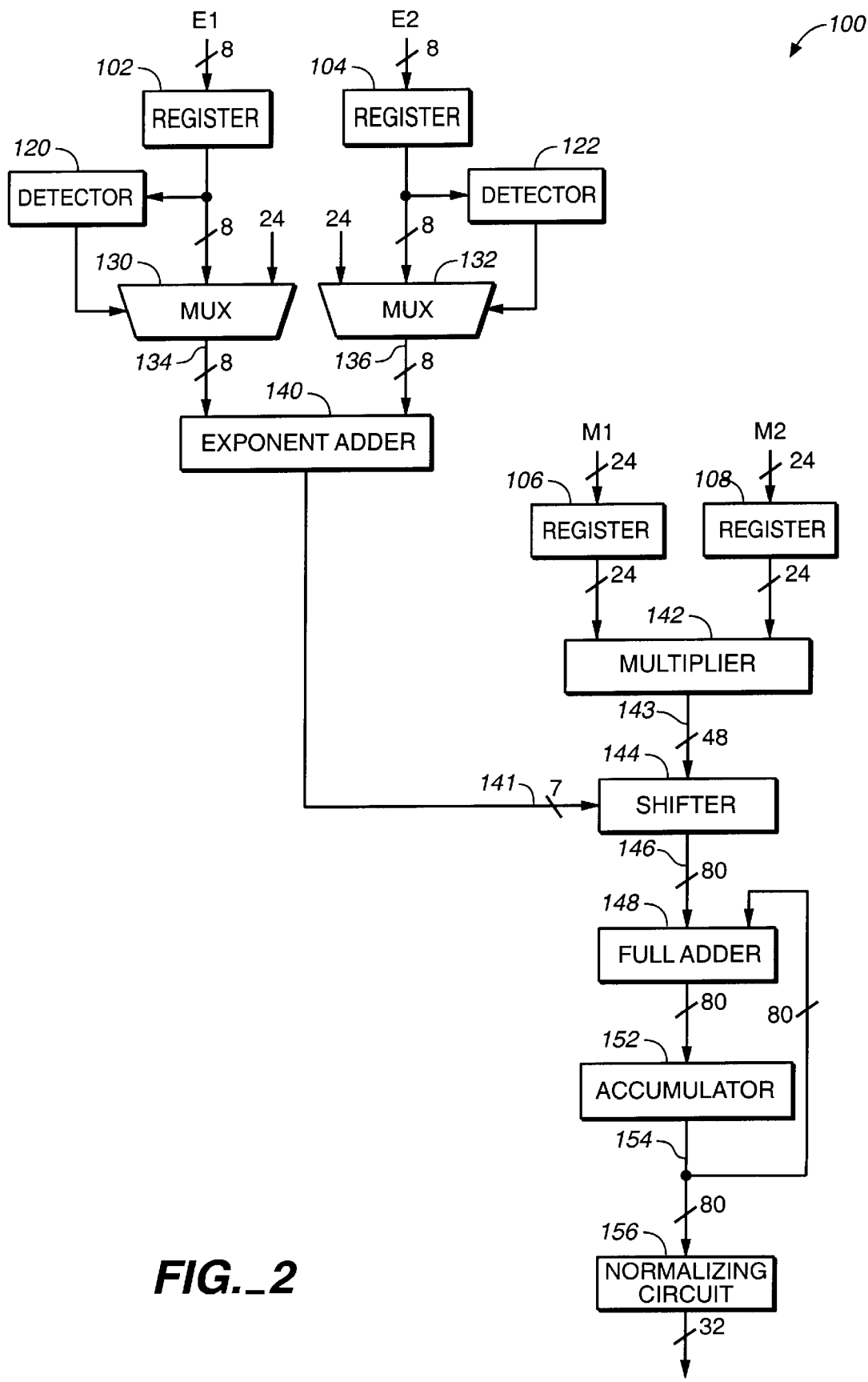
FIG._2

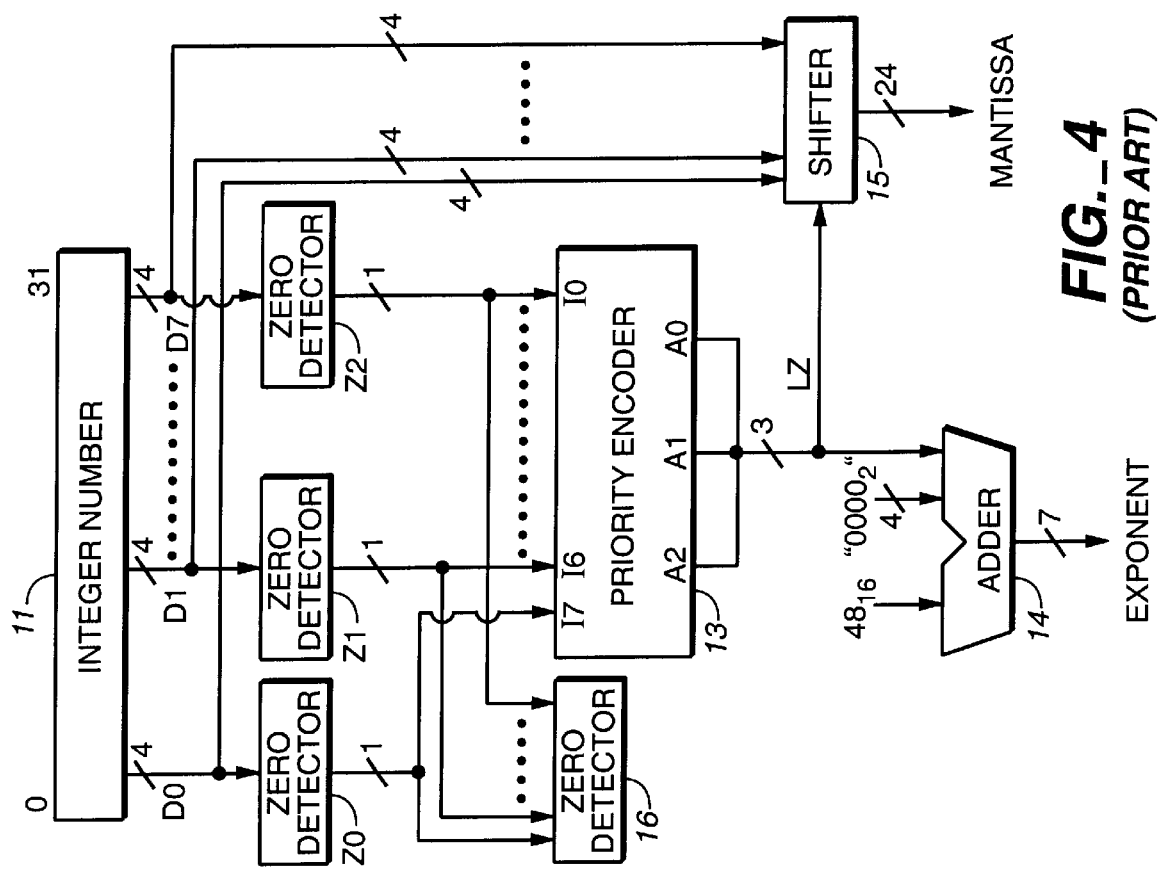
FIG._4 *(PRIOR ART)*
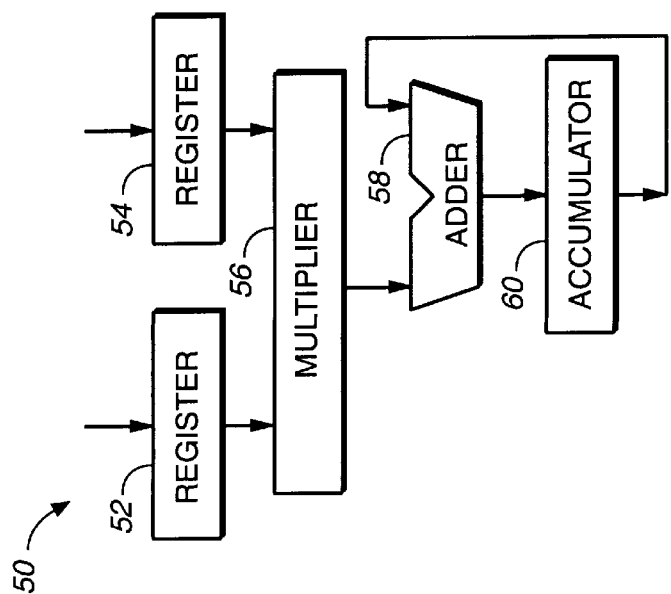
FIG._3 *(PRIOR ART)*

DIGITAL MULTIPLY-ACCUMULATE CIRCUIT THAT CAN OPERATE ON BOTH INTEGER AND FLOATING POINT NUMBERS SIMULTANEOUSLY

TECHNICAL FIELD

The present invention relates to Multiply-Accumulate circuits, and more particularly to a circuit that can directly receive two operands in both integer and floating point data formats, multiplies the two operands, and accumulates the resultant product.

BACKGROUND ART

FIG. 3 shows a typical digital Multiply-Accumulate circuit 50 of the prior art. Registers 52 and 54 hold two operands to be operated on. These two operands must be in the same data format, i.e. both must be either integers or floating point numbers. The two operands are multiplied in multiplier 56 and the resultant product is inputted into adder 58 as a first input. A second input of adder 58 comes from accumulator 60. The resultant sum of the two inputs generated by adder 58 will replace the current content of accumulator 60. Another pair of operands may be loaded into registers 52 and 54. Their product generated by multiplier 56 is accumulated by adder 58 into accumulator 60. So, accumulator 60 holds the sum of products of pairs of operands. For that reason, circuit 50 is also called a product adder.

A typical digital Multiply-Accumulate circuit as shown in FIG. 3 cannot operate on both integer and floating point numbers simultaneously. When a computation involves operands of both integer and floating point numbers, a separate converting circuit is used. The converting circuit may be of integer-to-floating-point type in which the integer is converted into a floating point number before being loaded into the floating point Multiply-Accumulate circuit to be multiplied with another floating point number.

FIG. 4 shows a typical Integer to Floating Point converting circuit of prior art. This circuit is disclosed and described in detail in U.S. Pat. No. 4,631,696. The 32-bit integer to be converted to floating point number is in register 11. Zero detectors Z0 to Z7 detects leading zeros of the integer. Priority encoder 13 receives the detection results from Zero detectors Z0 to Z7 and determines the necessary number of shifting places for the integer. Shifter 15 shifts the integer according to the control input LZ from priority encoder 13 producing the 24-bit mantissa. The detected number of leading zeros of the integer is used to calculate the 7-bit offset exponent using adder 14.

An object of the present invention is to provide a Multiply-Accumulate circuit that can accept operands of both integer and floating point numbers, but does not require much additional circuitry. Another object of the present invention is to use only one instruction set for operations on both integer and floating point numbers.

DISCLOSURE OF THE INVENTION

The Multiply-Accumulate circuit of the present invention realizes these objects by providing that operands of both integer and floating point numbers are represented in a special combined data format. This special combined data format allows for the circuit of the present invention. The format prescribes an exponent and a mantissa for both integer and floating point numbers. Floating point numbers still keep their original format, i.e. mantissa and exponent, except that floating point numbers with exponent having all zeros or all ones are defined to be invalid and are replaced with other close values which have exponents being not all ones or zeros. Number representations with exponents being all ones or all zeros are reserved for integer numbers.

The Multiply-Accumulate circuit of the present invention includes an exponent adder circuit, a mantissa multiplier circuit, a shifter, a full adder, and an accumulator. The product adder circuit receives two operands in the special combined data format. The exponent adder circuit adds the exponents of the two operands in the special combined data format. But if, before the addition, the exponent adder circuit detects an integer as an operand, it will replace the exponent of the integer with a substitute value in that addition. This substitute value is the number of bits of the mantissa of the integer. This replacement has the effect of implicitly converting the integer into a floating point number. The mantissa multiplier circuit multiplies the two mantissas of the two operands. The shifter shifts the resultant product of multiplication into a pre-defined fixed point format according to the resultant sun of the addition generated by the exponent adder circuit. The full adder adds this shifted product to the current content of the accumulator.

BRIEF DESCRIPTION OF THE DRAWINGS

FIG. 1A shows the 32-bit special combined data format for integer and floating point numbers according to the present invention.

FIG. 1B shows the 32-bit special combined data format for integers according to the present invention.

FIG. 1C shows an example of a negative integer in the 32-bit special combined data format according to the present invention.

FIG. 1D shows an example of a positive integer in the 32-bit special combined data format according to the present invention.

FIG. 1E shows the 32-bits special combined data format for floating point numbers according to the present invention.

FIG. 2 shows a schematic block diagram illustrating structures of an embodiment of the digital Multiply-Accumulate circuit of the present invention.

FIG. 3 shows a typical digital Multiply-Accumulate circuit of prior art.

FIG. 4 shows a typical Integer to Floating Point converting circuit of prior art.

BEST MODE FOR CARRYING OUT THE INVENTION

In the present invention, integers and floating point numbers are represented in a special combined data format. With reference to FIG. 1A, each number in the special combined data format, for illustrative purpose, has an 8-bit exponent (bits 23 to 30) and a 24-bit mantissa (bits 0 to 22 and bit 31).

With reference to FIG. 1B, the number is an integer. Its 24-bit "mantissa" (bits 0 to 22 and bit 31) is in 2-complement format. Its 8-bit "exponent" (bits 23 to 30) is filled with the value of bit 31, i.e. all zeros if the integer is positive and all ones if negative. So, this 32-bit special format can represent integers in a range from $-2^{23}$ to $2^{23}-1$. This range corresponds to $2^{24}$ different integer representations.

With reference to FIG. 1C, because decimal integer number −3 is represented as 111 . . . 1101 (24 bits) in 2-complement format, its 24-bit "mantissa" (bits 0 to 22 and bit 31) should be all ones except that bit 1 is 0. Its 8-bit "exponent" (bits 23 to 30) should be filled with all ones because the content of bit 31 is a one.

Similarly, with reference to FIG. 1D, because decimal integer number +3 is represented as 000 . . . 00011 (24 bits) in 2-complement format, its 24-bit "mantissa" (bits 0 to 22 and bit 31) should be all zeros except that bits 0 and 1 are 1s. Its 8-bit "exponent" (bits 23 to 30) should be filled with all zeros because the content of bit 31 is a zero.

The special combined data format allows integers not longer than 24 bits. Such an integer in the 32-bit special combined data format looks exactly the same as a 32-bit integer in 2-complement format. Therefore, integers in the special combined data format can also be used outside the Multiply-Accumulate circuit of the present invention (i.e. can be used in register to register arithmetic).

With reference to FIG. 1E, the number is a floating point number; its 24-bit "mantissa" (bits 0 to 22 and bit 31) in the special combined data format contains its 23-bit actual mantissa (bits 0 to 22) and its sign (bit 31). The 23-bit actual mantissa (bits 0 to 22) has originally 24 bits; however, because the floating point number is always in normalized form, i.e. there is always only a one to the left of the binary point, the one to the left of the binary point is implied and need not be shown. The floating point number's 8-bit "exponent" (bits 23 to 30) is in offset format. For example, an 8-bit "exponent" of 00000001 and 00000002 represent an exponent value of −127 and −126 in decimal, respectively; and an 8-bit "exponent" of 11111101 and 11111110 represent an exponent value of +125 and +126 in decimal, respectively. To avoid confusion with integers which have exponents being all ones or all zeros, there need be some adjustments. When a floating point number with exponent being all zeros is generated, the number is replaced by integer zero (all 32 bits being zeros). Because an exponent of all zeros for eight bits represents $2^{-128}$, the floating point number is very close to zero. Therefore, the replacement mentioned above is reasonable. Similarly, when a floating point number with exponent being all ones is generated, the number's exponent is changed from 11111111 to 11111110 (not all ones), and a flag is set. Because an exponent of all ones for eight bits represents $2^{127}$, the floating point number is extremely large in magnitude, a change from $2^{127}$ to $2^{126}$ has almost no effect on computations.

With reference to FIG. 2, Multiply-Accumulate circuit 100 includes four input registers 102, 104, 106, and 108 for receiving as input two operands in the special combined data format. Eight-bit exponents E1 and E2 of the first and second operands are loaded into input registers 102 and 104, respectively. Mantissas M1 and M2 of the first and second operands are loaded into input registers 106 and 108, respectively. The use of input registers 102, 104, 106, and 108 is optional. Exponent E1 can be led to detector 120 and multiplexer 130 directly. Similarly, exponent E2 can be led to detector 122 and multiplexer 132 directly. Mantissas M1 and M2 can be led to multiplier 142 directly.

From registers 102 and 104, exponents E1 and E2 are led to multiplexers 130 and 132, respectively. Exponents E1 and E2 are also led to detectors 120 and 122, respectively. Detector 120 determines if exponent E1 corresponds to an integer (i.e. exponent E1 being either all ones or all zeros) and, if so, controls multiplexer 130 to select value 24 (this special value. will be explained later) to be inputted into adder 140 as input 134. If not, detector 120 controls multiplexer 130 to pass exponent E1 to adder 140 as input 134. Similarly, detector 122 determines if exponent E2 corresponds to an integer (i.e. exponent E2 being either all ones or all zeros) and, if so, controls multiplexer 132 to select value 24 (this special value will be explained later) to be inputted into adder 140 as input 136. If not, detector 122 controls multiplexer 132 to pass exponent E2 to adder 140 as input 136. Adder 140 add two inputs 134 and 136 to produce exponent sum 141.

From registers 106 and 108, mantissas M1 and M2 are led to multiplier 142 which multiplies 24-bit mantissas M1 and M2 to produce 48-bit mantissa product 143. Mantissa product 143 is inputted into shifter 144. Shifter 144 shifts mantissa product 143 into a 48.32 fixed point data format, meaning there are 48 bits to the left of the binary point and 32 bits to the right of the binary point. The number of shifting positions or places depends on exponent sum 141.

Assuming that both operands are floating point numbers, mantissa product 143 generated by multiplier 142 is the product of two mantissas M1 and M2. Because both operands are in normalized form, positions of binary points for both mantissas M1 and M2 are known. Exponent sum 141 generated by adder 140 is the sum of two exponents E1 and E2 and hence represents the exponent of mantissa product 143. With the sum of exponents and final fixed point data format known, the necessary number of shifting places for the product of mantissas can be calculated and, therefore, shifter 144 can be designed accordingly to implement this shifting. If, for instance, the first operand is an integer, exponent E1 has all ones or all zeros. The binary point for the integer in 24-bit register 106 is 24 places to the right of that of a normalized floating point numbers. Therefore, when detector 120 recognizes the integer, detector 120 controls multiplexer 130 to pass a value 24 to adder 140. This has the effect of shifting the binary point of the integer 24 places to the left so that the integer becomes "normalized" floating point number. Therefore, if shifter 144 works fine for floating point operands in the special combined format, it will also work fine when integer operands in the special combined format are involved. Because the number of shifting places depends only on exponent sum 141 and the final 48.32 fixed point data format, shifter 144 can be pipelined so that one pair of operands can be operated on in each clock cycle.

Operand product 146 generated by shifter 144 is led to full adder 148 as a first input. A second input of full adder 148 comes from accumulator 152. Full adder 148 adds its two inputs and send the resultant sum to accumulator 152. This resultant sum replaces the current content of accumulator 152. Sum of products 154 generated by accumulator 152 is led to normalizing circuit 156 to be converted to a floating point number in the special combined format.

Because integers and floating point numbers are handled interchangeably, separate instruction sets for integers and floating point numbers are not required for operations of the Multiply-Accumulate circuit of the present invention.

What is claimed is:

1. A Multiply-Accumulate circuit comprising:
   (a) an exponent adder circuit having:
       a first multi-bit output;
       first and second multi-bit inputs for receiving as input first and second exponents of first and second operands, respectively, to be added by said exponent adder circuit, said adding of said first exponent and said second exponent by said exponent adder circuit producing a control exponent sum at said first multi-bit output, said first and second operands being both in a combined data format, said combined data format prescribing a mantissa and an exponent for both integer and floating point operands, said first and second operands having first and second mantissas, respectively, said exponent adder circuit monitoring said first exponent at said first multi-bit input and determining if said first operand is an integer, and in response to said first operand being an integer, substituting said first exponent in said adding by said exponent adder circuit with a substitute exponent, said substitute exponent being related to the number of bits of said first mantissa;

(b) a mantissa multiplier circuit having third and fourth multi-bit inputs for receiving as input first and second mantissas of said first and second operands, respectively, and a second multi-bit output, said mantissa multiplier circuit multiplying said first mantissa and said second mantissa to produce a mantissa product at said second multi-bit output; and (c) a shifter having fifth and sixth multi-bit inputs and a third multi-bit output, said fifth multi-bit input being connected to said first multi-bit output, said sixth multi-bit input being connected to said second multi-bit output, said shifter shifting said mantissa product according to said control exponent sum to produce a shifted number at said third multi-bit output, said shifted number being in a pre-defined fixed point format.

2. The Multiply-Accumulate circuit of claim 1 wherein said exponent adder circuit further comprising:

(a) an exponent adder having ninth and tenth multi-bit inputs and a sixth multi-bit output, said sixth multi-bit output being connected to said first multi-bit output;

(b) a first detector-selector having a seventh multi-bit input and a fourth multi-bit output, in7 being connected to said first multi-bit input, said fourth multi-bit output being connected to said ninth multi-bit input;

wherein said first detector-selector detects said first exponent at said seventh multi-bit input, and either passes said first exponent to said fourth multi-bit output if said first operand is a floating point number, or loads said substitute exponent to said fourth multi-bit output if said first operand is an integer.

3. The Multiply-Accumulate circuit of claim 2 wherein said first detector-selector further comprising:

(a) a first detecting circuit for receiving as input said first exponent from in7 and outputing a first control signal;

(b) a first multiplexer for receiving as control input said first control signal and as data input said first exponent and said substitute exponent and passing one of said first exponent and said substitute exponent to said fourth multi-bit output depending on said first control signal.

4. The Multiply-Accumulate circuit of claim 3 wherein said exponent adder circuit further comprising a second detector-selector having an eighth multi-bit input and a fifth multi-bit output, in8 being connected to said second multi-bit input, said fifth multi-bit output being connected to said tenth multi-bit input, wherein said second detector-selector detects said second exponent at said second multi-bit input, and either passes said second exponent to said fifth multi-bit output if said second operand is a floating point number, or loads said substitute exponent to said fifth multi-bit output if said second operand is an integer.

5. The Multiply-Accumulate circuit of claim 4 wherein said second detector-selector further comprising:

(a) a second detecting circuit for receiving as input said second exponent from in8 and outputing a second control signal;

(b) a second multiplexer for receiving as control input said second control signal and as data input said second exponent and said substitute exponent and passing one of said second exponent and said substitute exponent to said fifth multi-bit output depending on said second control signal.

6. The Multiply-Accumulate circuit of claim 5 further comprising a full adder coupled to said shifter for adding said shifted number and the content of an accumulator, said accumulator having a multi-bit input from and a multi-bit output to said full adder.

7. The Multiply-Accumulate circuit of claim 6 further comprising a normalizing circuit coupled to said accumulator for normalizing the content of said accumulator.

8. A method of performing accumulation of products comprising the steps of:

(a) using an exponent adder circuit to receive as input and add first and second exponents of first and second operands, respectively, to produce a control exponent sum, both said first and second operands being in a combined data format, said combined data format prescribing a mantissa and an exponent for both integer and floating point operands, said first and second operands having first and second mantissas, respectively;

(b) before said adding by said exponent adder circuit, using said exponent adder circuit to monitor said first exponent and determine if said first operand is an integer, and in response to said first operand being an integer, substitute said first exponent in said adding by said exponent adder circuit with a substitute exponent, said substitute exponent being related to the number of bits of said first mantissa;

(c) using a mantissa multiplier circuit to multiply said first mantissa and said second mantissa to produce a mantissa product;

(d) using a shifter coupled to said exponent adder circuit and said mantissa multiplier circuit to shift said mantissa product according to said control exponent sum to produce a shifted number, said shifted number being in a pre-defined fixed point format.

9. The method of claim 8 wherein the step of using said exponent adder circuit to monitor said first exponent further comprising the steps of:

(a) using a first detecting circuit to monitor said first exponent and thereby determine if said first operand is an integer, and in response to said first operand being an integer, send a first control signal said first control signal to a first multiplexer;

(b) using said first multiplexer to load one of said first exponent and said substitute exponent to an exponent adder in said exponent adder circuit according to said first control signal, said exponent adder producing said control exponent sum.

10. The method of claim 9 further comprising the step of using said exponent adder circuit, before said adding by said exponent adder circuit, to monitor said second exponent and determine if said second operand is an integer, and in response to said second operand being an integer, substitute said second exponent in said adding by said exponent adder circuit with said substitute exponent.

11. The method of claim 10 wherein the step of using said exponent adder circuit to monitor said second exponent further comprising the steps of:

(a) using a second detecting circuit to monitor said second exponent and thereby determine if said second operand is an integer, and in response to said second operand being an integer, send a second control signal said second control signal to a second multiplexer; and (b) using said second multiplexer to load one of said second exponent and said substitute exponent to exponent adder said exponent adder in said exponent adder circuit according to said second control signal.

12. The method of claim 11 further comprising the step of using a full adder coupled to said shifter to add said shifted number and the content of an accumulator, said accumulator having a multi-bit input from and a multi-bit output to said full adder.

13. The method of claim 11 further comprising the step of using a normalizing circuit coupled to said accumulator for normalizing the content of said accumulator.

14. A Multiply-Accumulate circuit comprising:

(a) an exponent adder circuit having:
   a first multi-bit output;
   first and second multi-bit inputs for receiving as input first and second exponents of first and second operands, respectively, to be added by said exponent adder circuit using an exponent adder, said adding of said first exponent and said second exponent by said exponent adder producing a control exponent sum at said first multi-bit output, said first and second operands being both in a combined data format, said combined data format prescribing a mantissa and an exponent for both integer and floating point operands, said first and second operands having first and second mantissas, respectively; and
   a first detector-selector coupled to said first multi-bit input for monitoring said first exponent and determining if said first operand is an integer, and in response to said first operand being an integer, substituting said first exponent in said adding by said exponent adder with a substitute exponent, said substitute exponent being related to the number of bits of said first mantissa;

(b) a mantissa multiplier circuit having third and fourth multi-bit inputs for receiving as input said first and second mantissas of said first and second operands, respectively, and a second multi-bit output, said mantissa multiplier circuit multiplying said first mantissa and said second mantissa to produce a mantissa product at said multi-bit output2;

(c) a shifter having fifth and sixth multi-bit inputs, said fifth multi-bit input being connected to said first multi-bit output, said sixth multi-bit input being connected to said second multi-bit output, said shifter shifting said mantissa product according to said control exponent sum to produce a shifted number, said shifted number being in a pre-defined fixed point format.

15. The Multiply-Accumulate circuit of claim 14 wherein said first detector-selector further comprising:

(a) a first multiplexer for loading one of said first exponent and said substitute exponent to said exponent adder;

(b) a first detecting circuit for receiving as input said first exponent and outputting a first control signal to said first multiplexer, said first control signal deciding which one of said first exponent and said substitute exponent will be loaded by said first multiplexer to said exponent adder.

16. The Multiply-Accumulate circuit of claim 15 wherein said exponent adder circuit further comprising a second detector-selector coupled to said second multi-bit input for monitoring said second exponent and determining if said second operand is an integer, and in response to said second operand being an integer, substituting said second exponent in said adding by said exponent adder with said substitute exponent.

17. The Multiply-Accumulate circuit of claim 16 wherein said second detector-selector further comprising:

(a) a second multiplexer for loading one of E2 or said substitute exponent to said exponent adder;

(b) a second detecting circuit for receiving as input said second exponent and outputting a first control signal to said second multiplexer, said second control signal deciding which one of E2 and said substitute exponent will be loaded by said second multiplexer to said exponent adder.

18. The Multiply-Accumulate circuit of claim 17 further comprising a full adder coupled to said shifter for adding said shifted number and the content of an accumulator, said accumulator having a multi-bit input from and a multi-bit output to said full adder.

19. The Multiply-Accumulate circuit of claim 18 further comprising a normalizing circuit coupled to said accumulator for normalizing the content of said accumulator.

20. The Multiply-Accumulate circuit of claim 19 wherein said substitute exponent equals the number of bits of said first mantissa.

* * * * *